United States Patent
Huang et al.

(10) Patent No.: US 7,206,007 B2
(45) Date of Patent: Apr. 17, 2007

(54) METHOD FOR VIDEO PROCESSING AND SCALAR USING THE SAME

(75) Inventors: Chung-Hsun Huang, Tainan County (TW); Yuan-Kai Chu, Tainan County (TW); Kuei-Hsiang Chen, Tainan County (TW)

(73) Assignee: Himax Technologies, Inc., Tainan County (TW)

( * ) Notice: Subject to any disclaimer, the term of this patent is extended or adjusted under 35 U.S.C. 154(b) by 59 days.

(21) Appl. No.: 10/906,139

(22) Filed: Feb. 4, 2005

(65) Prior Publication Data

US 2006/0176320 A1    Aug. 10, 2006

(51) Int. Cl.
*G06T 15/00* (2006.01)

(52) U.S. Cl. .................................................... 345/698

(58) Field of Classification Search ................ 345/428, 345/698; 370/352; 348/581
See application file for complete search history.

(56) References Cited

U.S. PATENT DOCUMENTS

| | | | |
|---|---|---|---|
| 5,739,867 A | 4/1998 | Eglit | 348/581 |
| 6,693,895 B1 * | 2/2004 | Crummey et al. | 370/352 |

* cited by examiner

*Primary Examiner*—Almis R. Jankus
(74) *Attorney, Agent, or Firm*—Jianq Chyun IP Office

(57) ABSTRACT

A method for video processing which provides a scaled image using two different clock frequencies is provided. The method receives source pixel data using a first clock signal and scales the source pixel data to destination pixel data. After that, the destination pixel data is provided using a second clock signal having a second clock frequency and a third clock signal having a third clock frequency during blanking period and active period, respectively.

7 Claims, 5 Drawing Sheets

METHOD FOR VIDEO PROCESSING AND SCALAR USING THE SAME

BACKGROUND OF THE INVENTION

1. Field of Invention

The present invention relates to video processing, and more particularly to a scalar and video processing method wherein pixel data of the scaled images are provided using two clock signals having different frequencies.

2. Description of Related Art

Graphics systems often display images on display screens. For example, a computer system may display the image of an object on a flat-panel monitor. Television systems and cameras are some of the other examples of such graphics systems. To achieve the display of an image, the image is generally represented by image data, and display signals are generated from the image data. The display signals cause the image to be displayed on a corresponding display screen.

During such a display, a graphics system may need to scale (either upscale or downscale) the image. A method for scaling the image is provided in U.S. Pat. No. 5,739,867 (hereinafter, the '867). By using the '867, a source image could be upscaled in both vertical and horizontal directions to generate a destination image frame. The upscaling can be performed without maintaining the aspect ratio of the source image as required in the specific context. Aspect ratio of an image generally refers to the ratio of the length of the image to the width of the image. The '867 can upscale images without having to maintain the aspect ratio of the source image. Accordingly, a user typically has the option of specifying the length and breadth of the destination image without regard to the aspect ratio of the source image.

However, the increased pixel data resulting from the up-scaling necessitate a clock signal for outputting the destination images having a frequency higher than that for receiving the source images. The high-frequency destination clock signal induces a high power consumption which is a critical disadvantage in circuit design.

SUMMARY OF THE INVENTION

An aspect of the present invention provides a method for video processing which provides a scaled image using two different clock frequencies. The method receives source pixel data using a first clock signal and scales the source pixel data to destination pixel data. After that, the destination pixel data is provided using a second clock signal having a second clock frequency and a third clock signal having a third clock frequency.

In one embodiment of the present invention, the destination pixel data is provided using the first clock signal while the destination pixel data being in blanking period, and the destination pixel data is provided using the second clock signal while the destination pixel data being in active period, wherein, the first clock frequency is higher than the second clock frequency.

Another aspect of the present invention provides a scalar for processing a source image frame to generate a destination image frame, a frame period of which comprises a first and second sub-period respectively composed of active and blanking scan periods. The scalar comprises a clock input, a source image input, a scalar module, a clock output and a destination image output. The clock input receives a first clock signal and the source image input receives source pixel data according to the first clock signal. The scalar module couples to the source image input for scaling the received source pixel data to a destination pixel data. The clock output outputs a second clock signal having a second clock frequency or a third clock signal having a third clock frequency, and the destination image output provides the destination pixel data according to the second/third clock signal during the first and second sub-period, respectively.

Accordingly, the method and scalar of the present invention provides the scaled image with a faster clock frequency when the output pixel is in a blanking period and at a slower clock frequency when the output pixel is in active period. Because most of the circuits in the display system do not operate in blanking period, higher operation clock frequency would not consume too much power. Instead, the circuits operate in lower clock frequency while in active period and therefore less power is consumed comparing with the circuits using the destination clock frequency only.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
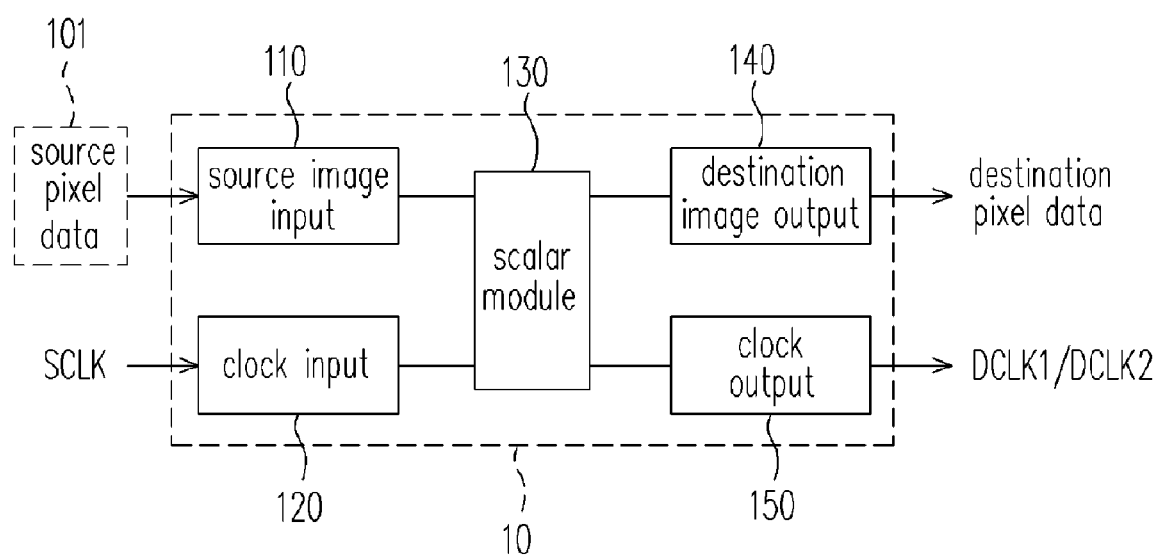
FIG. 1A is a block diagram of a scalar for image processing according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1A shows a scalar according to one embodiment of the present invention. The scalar 10 includes a source image input 110, a clock input 120, a scalar module 130, a destination image output 140 and a clock output 150. The source image input receives source pixel data 101 included in source image frames, and the scale module 130 scales the source image frames to generate destination pixel data 102 representative of destination image frames. The source pixel data 101 are received using a source clock signal SCLK received from the clock input 120. The destination pixel data 102 are provided using two destination clock signals DCLK1 and DCLK2.

Figure 1B:
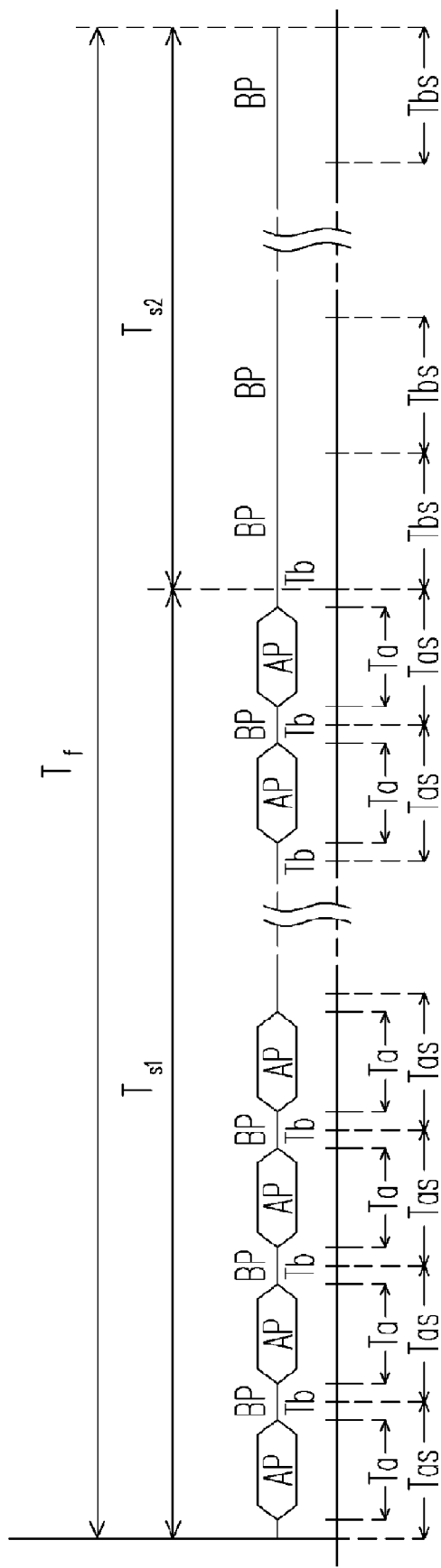
FIG. 1B is a timing chart of an image frame processed by the scalar according to one embodiment of the present invention.

Those skilled in the art will appreciate that, as shown in FIG. 1B, a frame period $T_f$ of the destination image frame comprises two sub-periods $T_{s1}$ and $T_{s2}$ respectively composed of active scan periods $T_{as}$ and blanking scan periods $T_{bs}$, and each active scan period $T_{as}$ is further composed of an active period $T_a$ and a blanking period $T_b$ during which active destination pixel data AP and blanking destination pixel data BP are provided respectively. There is no active destination pixel data AP provided during each blanking scan period $T_{bs}$. In a first embodiment, the active and blanking destination pixel data are provided using the destination clock signals DCLK1 and DCLK2, respectively. In an alternative second embodiment, all the destination pixel data (active or blanking) in the sub-period $T_{s1}$ are provided using the destination clock signals DCLK2 while those (blanking) in the sub-period $T_{s2}$ are provided using the destination clock signal DCLK1. The destination clock signal DCLK2 has a frequency lower than that of the destination clock signal DCLK1.

Figure 2:
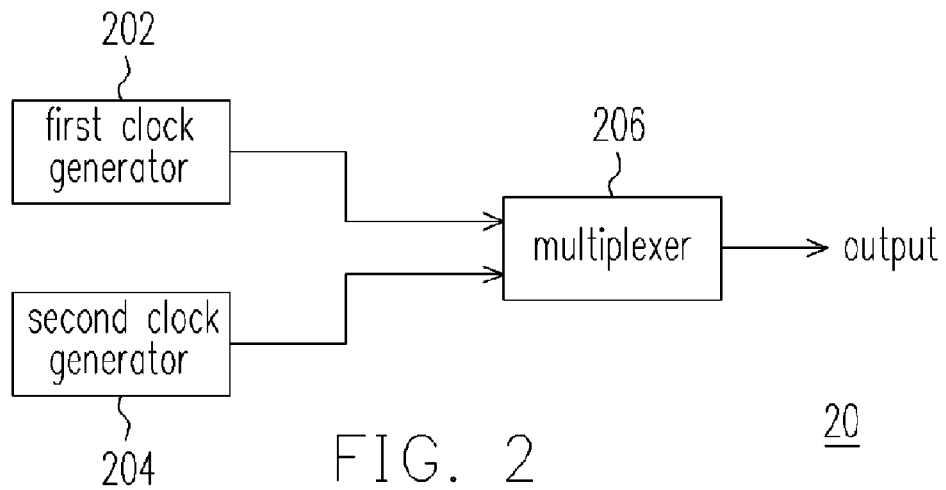
FIG. 2 is a block diagram of a clock generator for selectively outputting clock signals DCLK1 and DCLK2 as in FIG. 1 according to one embodiment of the present invention.

To supply one of the two clock signals for operation, one of a plurality of approaches is shown in FIG. 2. FIG. 2 is a block diagram of a clock generator for selectively outputting clock signals DCLK1 and DCLK2 as in FIG. 1 according to one embodiment of the present invention. In the embodiment, the clock generator 20 comprises a first clock generator 202, a second clock generator 204 and a multiplexer 206. The first clock generator 202 generates a first clock signal having the above mentioned first clock frequency while the second clock generator 204 generates a second clock signal having the second clock frequency. The multiplexer 206 couples to the first/second clock generator 202/204 and selects one of the first clock signal and second clock signal for data output clock of the scalar 10.

Figure 3:
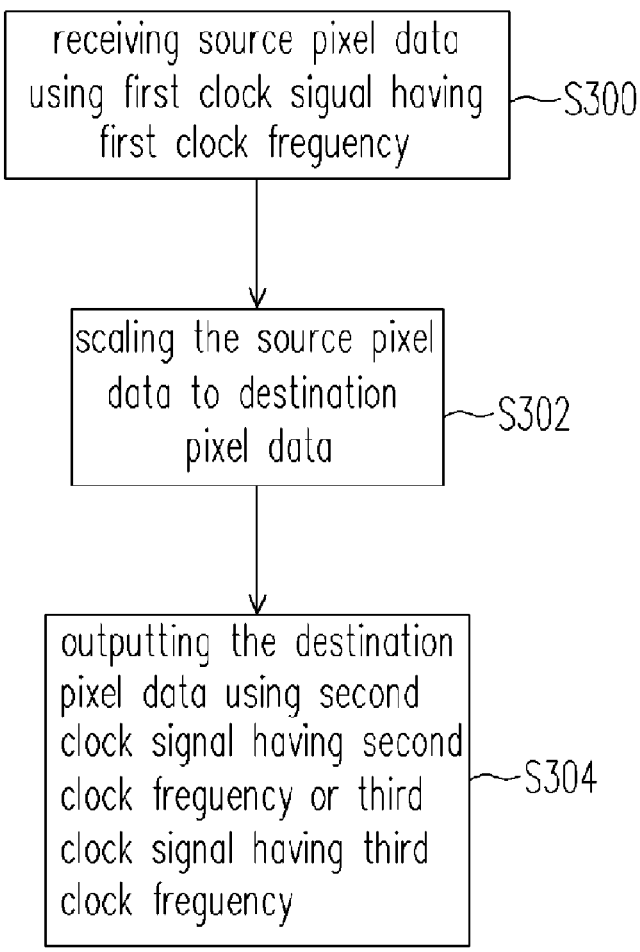
FIG. 3 is a flow chart of an image scaling method according to one embodiment of the present invention.

For clearly explaining the present invention, the operation method of the scalar 10 will be discussed referring to FIGS. 3–6. FIG. 3 is a flow chart of an image scaling method according to one embodiment of the present invention. The source pixel data is received via the source image input 110 (Step S300) and the source pixel data is scaled to the destination pixel data (Step S302). After that, the destination pixel data is provided using a first destination clock signal (DCLK1) having a first clock frequency and a second destination clock signal (DCLK2) having a second clock frequency (Step S304), wherein the first clock frequency is higher than the second clock frequency.

Figure 4:
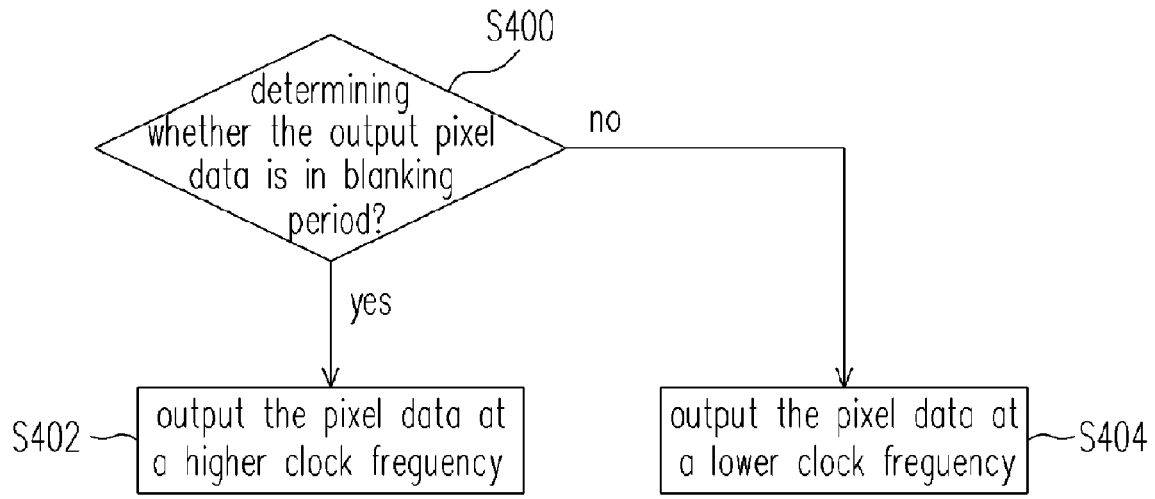
FIG. 4 is a flow chart shown how to output the pixel data at two different clock frequencies according to one embodiment of the present invention.
Figure 5:
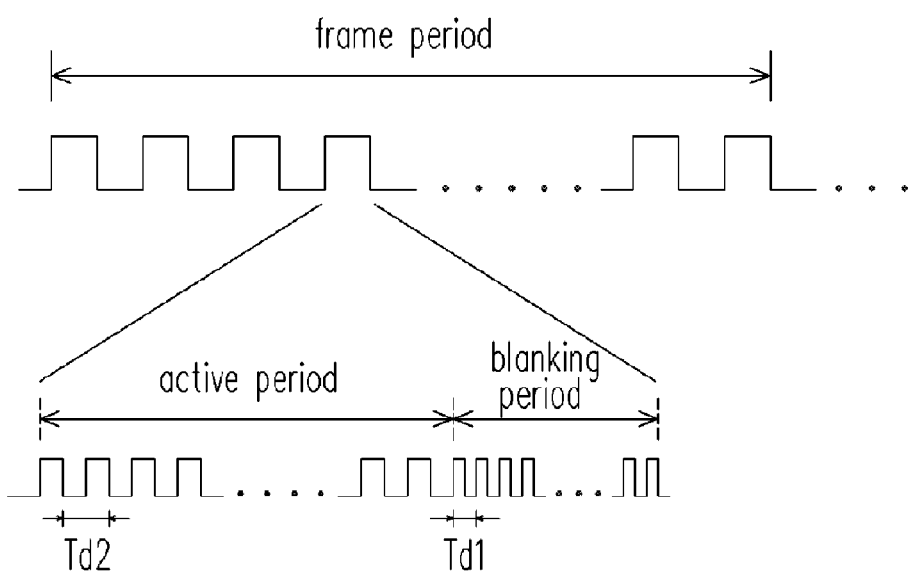
FIG. 5 is a timing chart shown the relationship between active period, blanking period, DCLK1 and DCLK2 according to one embodiment of the present invention.

Referring to FIG. 4 and FIG. 5, wherein FIG. 4 shows a flow chart about outputting the pixel data at two different clock frequencies according to one embodiment of the present invention, and FIG. 5 is a timing chart showing the relationship between active period, blanking period, first destination clock signal DCLK1 and second destination clock signal DCLK2 according to one embodiment of the present invention, a more detailed embodiment is discussed herewith.

For easily understanding, the scan line in a frame period could be divided into two sub-periods, which are active period and blanking period, as shown in FIG. 5. For the purpose that the frame could be normally displayed on the display apparatus without using extra frame buffer, the first destination clock signal (DCLK1) and second destination clock signal (DCLK2) must be estimated according to how many pixels are in the active area while others are in the blanking area.

The first and second destination clock signals could be estimated as follows.

When the source image is XGA, i.e., 1024($H_{act\_src}$)×768 ($V_{act\_src}$), the pixels in each scan line ($V_{total\_scr}$) should be 806 and there should be 1344 scan lines ($H_{total\_src}$). Assume the source clock frequency is 65 MHz (i.e., clock period $t_{sclk}$=15.39 ns), the frame period $T_{frame\_src}$ could be calculated as follows:

$$T_{frame\_src}=15.39*1344*806=16.67 \text{ ms}$$

When the destination image is SXGA, i.e., 1280 ($H_{act\_des}$)×1024($V_{act\_des}$), the pixels in each scan line ($V_{total\_des}$) should be 1066 and there should be 1688 scan lines ($H_{total\_des}$). Assume the first clock frequency ($F_{dclk1}$) to be twice as the second clock frequency ($F_{dclk2}$), i.e., the clock period ($T_{d2}$) of the second destination clock signal is twice as the clock period ($T_{d1}$) of the first destination clock signal, then:

$$T_{frame\_des} = T_{d2} * H_{act\_des} * V_{total\_des} + T_{d1} * H_{blk\_des} * V_{total\_des}$$
$$= T_{d1} * V_{total\_des} * (2*H_{act\_des} + H_{blk\_des})$$

If no additional frame buffer is used, the $T_{frame\_des}$ equals to the $T_{frame\_src}$:

$$16.67 \text{ ms}=T_{d1}*1066*(2*1280+(1688-1280))$$

Therefore, $T_{d1}$ equals to 5.28 ns and $T_{d2}$ equals to 10.56 ns, while the clock period of the original destination clock signal should be 9.26 ns if only one destination clock signal is used. Accordingly, the first clock frequency is higher than a destination clock frequency of the original destination clock signal and the second clock frequency is lower than the destination clock frequency.

Although the first and second destination clock signals are estimated dynamically according to the difference between the source pixel data and the destination pixel data, they could be fixed or chosen from a set of pre-calculated value. After determining the first and second destination clock frequency, the scalar determines whether the time is in the blanking period (Step S400). When the time is in the blanking period, a clock signal having a higher clock frequency, i.e. the above-mentioned first clock frequency, is provided for outputting pixel data (Step S402). On the contrary, when the time is in the active period, a clock signal having a lower clock frequency, i.e., the above-mentioned second clock frequency, is provided for outputting pixel data (Step S404).

Figure 6:
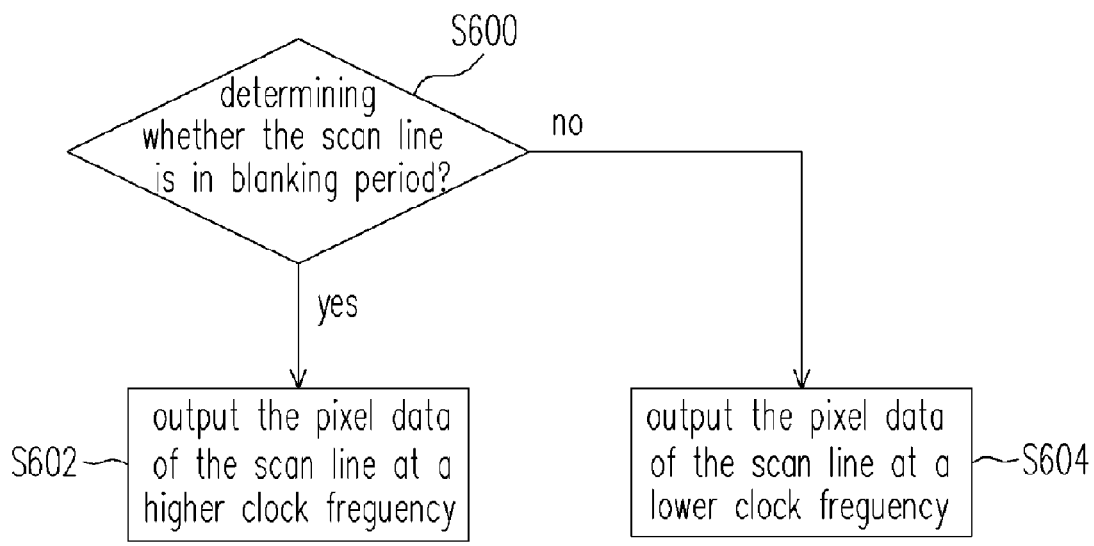
FIG. 6 is a flow chart shown how to output the pixel data at two different clock frequencies according to another embodiment of the present invention.
Figure 7:
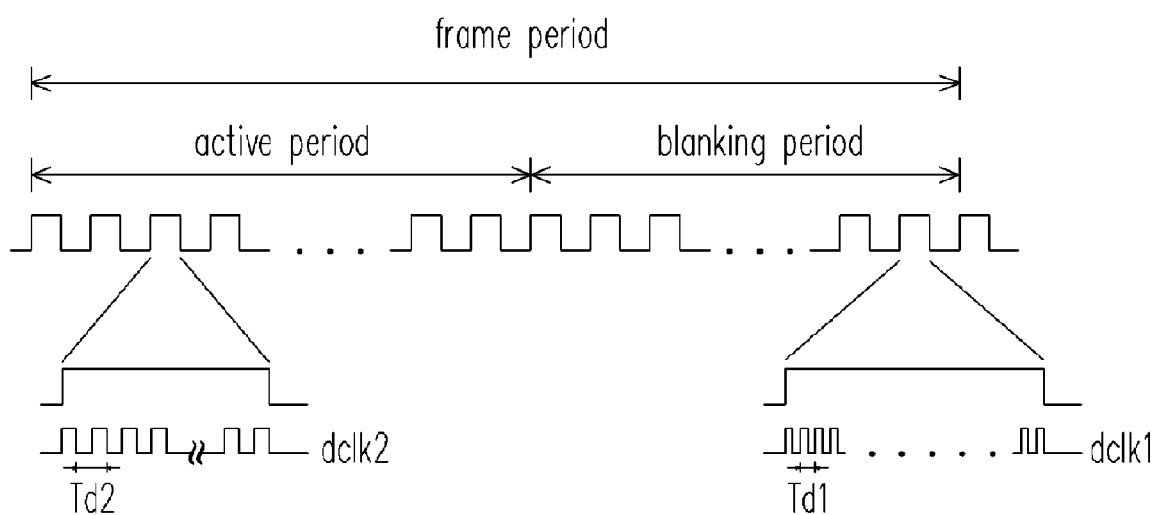
FIG. 7 is a timing chart shown the relationship between active period, blanking period, DCLK1 and DCLK2 according to another embodiment of the present invention.

Another embodiment of the present application will be discussed relating to FIG. 6 and FIG. 7, wherein FIG. 6 is a flow chart showing how to output the pixel data at two different clock frequencies according to another embodiment of the present invention, and FIG. 7 is a timing chart showing the relationship between active period, blanking period, first clock and second clock according to another embodiment of the present invention.

In the embodiment, a frame period can be divided into two sub-periods, which are active period and blanking period, as shown in FIG. 7. For the purpose that the frame could be normally displayed on the display apparatus without using extra frame buffer, the first destination clock signal (DCLK1) and second destination clock signal (DCLK2)

must be estimated according to how many scan lines are in the active area while others are in the blanking area.

The first and second destination clock signals could be estimated as follows.

When the source image is XGA, i.e., 1024($H_{act\_src}$)×768 ($V_{act\_src}$), the pixels in each scan line ($V_{total\_scr}$) should be 806 and there should be 1344 scan lines ($H_{total\_src}$). Assume the source clock frequency is 65 MHz (i.e., clock period $t_{sclk}$=15.39 ns), the frame period $T_{frame\_src}$ could be calculated as follows:

$$T_{frame\_src} = 15.39*1344*806 = 16.67 \text{ ms}$$

When the destination image is SXGA, i.e., 1280 ($H_{act\_des}$)×1024($V_{act\_des}$), the pixels in each scan line ($V_{total\_des}$) should be 1066 and there should be 1688 scan lines ($H_{total\_des}$). Assume the first clock frequency ($F_{dclk1}$) to be twice as the second clock frequency ($F_{dclk2}$), i.e., the clock period ($T_{d2}$) of the second destination clock signal is twice as the clock period ($T_{d1}$) of the first destination clock signal, then:

$$T_{frame\_des} = T_{d2} * H_{total\_des} * V_{act\_des} + T_{d1} * H_{total\_des} * V_{blk1\_des}$$

$$= T_{d1} * V_{total\_des} * (2 * V_{act\_des} + V_{blk\_des})$$

If no additional frame buffer is used, the $T_{frame\_des}$ equals to the $T_{frame\_src}$:

$$16.67 \text{ ms} = T_{d1} * 1688 * (2*1024 + (1066-1024))$$

Therefore, $T_{d1}$ equals to 4.73 ns and $T_{d2}$ equals to 9.46 ns, while the clock period of the original destination clock signal should be 9.26 ns when only one destination clock signal is used. Accordingly, the first clock frequency is higher than a destination clock frequency of the original destination clock signal and the second clock frequency is lower than the destination clock frequency.

After determining the first and second destination clock signals, the scalar determines whether the output scan line is in the blanking period (Step S600). When the scan line going to be output is in the blanking period, pixel data in the scan line is output using a clock signal having a higher clock frequency, i.e. the above-mentioned first clock frequency (Step S602). On the contrary, when the scan line going to be output is in the active period, the scan line is determined to be output using a clock signal having a lower clock frequency, i.e., the above-mentioned second clock frequency (Step S604).

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A method for processing a source image frame to generate a destination image frame, a frame period of which comprises a plurality of active and blanking periods, the method comprising the steps of:

receiving source pixel data included in the source image frame using a first clock signal;

generating a second and third clock signals;

scaling the source image frame to generate destination pixel data representative of the destination image frame; and providing the destination pixel data during the active and blanking periods using a second clock signal and a third clock signal, respectively, wherein, the second clock signal having a first clock frequency that is different from a second clock frequency of the the third clock signal.

2. The image scaling method of claim 1, wherein the step of providing the destination pixel data during the active and blanking periods using the second and third clock signals comprising:

providing the destination pixel data using the second clock signal having the first clock frequency while the destination pixel data being in blanking period; and providing the destination pixel data using the third clock signal having the second clock frequency while the destination pixel data being in active period.

3. The image scaling method of claim 1, wherein the step of providing the destination pixel data during the active and blanking periods using the second and third clock signals comprising:

sequentially providing the destination pixel data in a scan line, wherein a part of the scan line being provided using the second clock signal when the part of scan line being in blanking period, and another part of the scan line being provided using the third clock signal.

4. The image scaling method of claim 1, wherein the step of providing the destination pixel data during the active and blanking periods using the second and third clock signals comprising:

sequentially providing a plurality of scan lines in the destination image frame, wherein pixel data of a part of the scan lines being provided using the second clock signal when the part of the scan lines being in blanking period, and pixel data of another part of the scan lines being provided using the third clock signal.

5. A scalar for processing a source image frame to generate a destination image frame, a frame period of which comprises a first and second sub-period respectively composed of active and blanking scan periods, the scalar comprising:

a clock input for receiving a first clock signal having a first clock frequency;

a source image input for receiving source pixel data according to the first clock signal;

a scalar module for converting the received source pixel data into a destination pixel data;

a clock output for outputting a second clock signal having a second clock frequency or a third clock signal having a third clock frequency; and a destination image output for providing the destination pixel data according to the second/third clock signals during the first and second sub-period, respectively.

6. The scalar of claim 5, further comprising:

a first clock generator, generating the second clock signal having the second clock frequency;

a second clock generator, generating the third clock signal having the third clock frequency; and a multiplexer, coupled to the first/second clock generator for selecting and outputting one of the second/third clock signals.

7. A method for processing a source image frame to generate a destination image frame, a frame period of which comprises a first and second sub-period respectively composed of active and blanking scan periods, the method comprising the steps of:

receiving source pixel data included in the source image frame using a first clock signal;

generating a second and third clock signals;

scaling the source image frame to generate destination pixel data representative of the destination image frame; and providing the destination pixel data during the first and second sub-periods using the second and third clock signals, respectively.

* * * * *